UNITED STATES PATENT OFFICE.

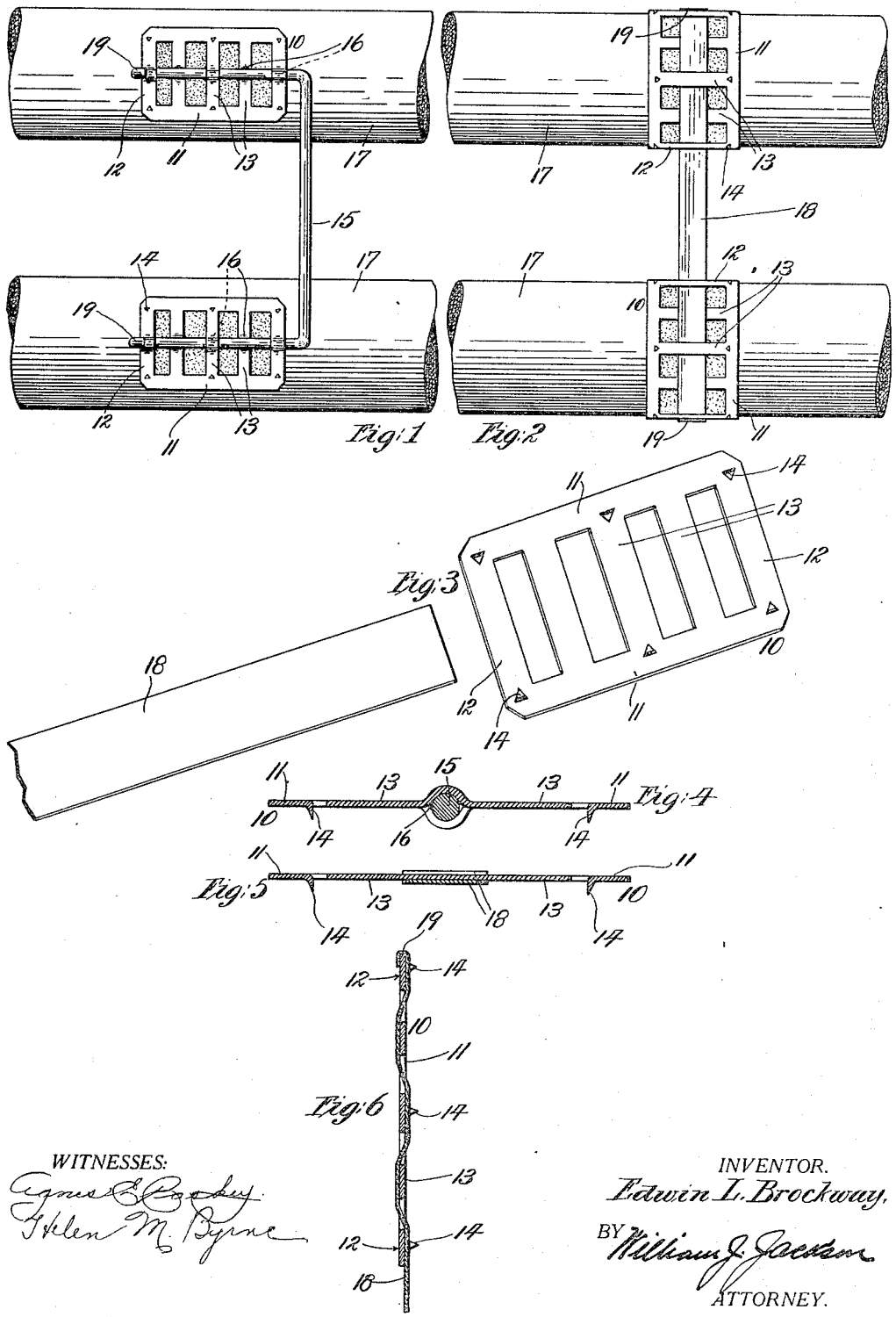

EDWIN L. BROCKWAY, OF GLENSIDE, PENNSYLVANIA.

CABLE-BONDING DEVICE.

1,168,596.  Specification of Letters Patent.  Patented Jan. 18, 1916.

Application filed January 16, 1915. Serial No. 2,591.

*To all whom it may concern:*

Be it known that I, EDWIN L. BROCKWAY, a citizen of the United States, residing at Glenside, in the county of Montgomery and State of Pennsylvania, have invented a certain new and useful Improved Cable-Bonding Device, of which the following is a specification.

The principal object of the present invention may be said to reside in the providing of a simple, inexpensive and efficient bonding device in which maximum contacting and bonding surface is provided.

A further object of the present invention is to provide a bonding device in which the parts may be conveniently and rapidly secured in position, particularly in contracted or narrow working spaces, as where numerous cables are in close juxtaposition.

A further object of the present invention is to provide a bonding device so constructed that the connecting ribbons, straps or wires used, may be neatly finished off so that no loose or ragged ends are left.

With these and other objects in view, the invention consists of the improvements hereinafter described and finally claimed.

The nature, characteristic features and scope of the invention will be more fully understood from the following description taken in connection with the accompanying drawings forming part hereof and in which:

Figure 1, is a top or plan view of the bonding device of the invention as applied to electric cables. Fig. 2, is a similar view illustrating a slightly different mode of application. Fig. 3, is a perspective view of the bonding device and connecting ribbon shown in Fig. 2, in position for assembling. Fig. 4, is a view in cross-section drawn to an enlarged scale, of the bonding device shown in Fig. 1. Fig. 5, is a similar view of the bonding device shown in Fig. 2, and Fig. 6, is a view in vertical section of the bonding device shown in Fig. 2.

In the drawings, there is disclosed a physical embodiment of the invention designed in a manner best known to me at this time for practising the invention. For illustrative purposes, the bonding device is shown as being rectangular in form, although I have in mind constructing the same in elliptical, circular and other shapes. In the specific form disclosed, 10, designates a thin, rectangular grid, of pliable material possessing conducting properties. In practice, the grid is preferably formed in one piece and consists of a frame made up of side strips 11, and end strips 12, which side strips are connected by a series of spaced cross-bars 13. The side strips 11, have stamped therefrom short, pointed projections 14, which extend below the bottom of the grid for a purpose to be presently described. In practice, the sheets of material from which these grids are made are first immersed in a bath of solder. By this treatment, the grids may be efficiently and expeditiously soldered to place upon cable sheaths. Adapted to have interlaced relation with such a grid is a connecting strap, ribbon or wire.

In Figs. 1, and 4, a wire 15, is disclosed as the connecting element, in which instance the bars 13, of the grid are grooved as at 16, to accommodate such wire, and the grid is arranged longitudinally of the cable 17.

In Figs. 2, 3, 5, and 6, a ribbon or strap 18, is disclosed as the connecting element, and the grid is disposed cross-wise of the cable. The connecting straps, ribbons and wires are also solder coated.

With a strap, ribbon or wire interlaced with respect to a grid, the attachment thereof to a cable is as follows: The sheath of a cable is first scraped to remove any corrosion which may be present. The grid is then positioned upon the cable and being of pliable material may be readily made to conform to the cable contour. In this conforming procedure, the short pointed projections are caused to slightly penetrate the sheath of the cable. By this penetration, if all corrosion has not been removed from that part of the cable sheath to which the bond is to be made, the said projections will reach beneath the sheath surface and enter a chemically pure cable sheath and form a good electrical connection. The grid is now bonded to place by means of soldering irons as well understood in the art. In this connection, it is to be noted that in the bonding proceedings the grid may be held in position upon a cable by the operator holding the connecting ribbon, strap or wire in one hand while he solders with the other hand. This feature is important where the operator is working in small, restricted space. With the grid in fixed position, the connecting strap, ribbon or wire is bonded to the grid and cable sheath and the grid is bonded to the cable sheath which taken in connection with the fact that the grid points or projections have slightly penetrated the cable sheath, provides a very good electrical connection.

In practice, the free ends of the connecting straps, ribbons or wires are cut close to the grid ends and are turned over upon the grid ends as at 19. Thus a neat finish is provided and all loose and ragged ends eliminated which is advantageous in the prevention of the escape of stray current.

Another important feature is that maximum sized spaces are provided between the edges or sides of the connecting element and the frame of the grid so that a soldering iron may be readily applied therebetween. Thus practically all parts of the bonding device may be heated to secure the desired bond.

What I claim is:

1. A device of the class described embracing a frame of thin, pliable, conducting material which frame is connected by a series of spaced cross-bars to form a grid to receive in interlaced fashion a connecting element, the underside of which grid has depending therefrom a series of projections or points.

2. A device of the class described formed from a single piece of metal and embracing a frame of thin, pliable material which frame is connected by a series of spaced cross-bars to form a grid to receive in interlaced fashion a connecting element, the underside of which grid has depending therefrom a series of projections or points.

3. A device of the class described embracing a frame of thin, pliable conducting material, which frame is integrally connected by a series of spaced cross-bars to form a grid, said grid having struck out therefrom depending projections or points.

4. In combination, a cable, a grid of thin, pliable conducting material, and a connecting element having interlaced relation with the grid, the spaces formed between the bars of the grid and between the edges or sides of the connecting element and the grid frame being of maximum size.

In testimony whereof, I have hereunto signed my name.

EDWIN L. BROCKWAY.

Witnesses:
Thos. C. Allen,
William J. Jackson.

Copies of this patent may be obtained for five cents each, by addressing the "Commissioner of Patents, Washington, D. C."